US010359892B2

(12) United States Patent
Lee et al.

(10) Patent No.: US 10,359,892 B2
(45) Date of Patent: Jul. 23, 2019

(54) FLEXIBLE TOUCH SENSING UNIT AND FLEXIBLE DISPLAY DEVICE INCLUDING FLEXIBLE TOUCH SENSING UNIT

(71) Applicant: Samsung Display Co., Ltd., Yongin-si (KR)

(72) Inventors: Kang-Won Lee, Seoul (KR); Young-Sik Kim, Cheonan-si (KR); Hee-Woong Park, Hwaseong-si (KR); Young-Seok Yoo, Suwon-si (KR); Jeong-Heon Lee, Seongnam-si (KR); Sung-Hwan Kim, Ulsan (KR); Hyung-Chul Kim, Asan-si (KR); Choon-Hyop Lee, Hwaseong-si (KR); Hyun-Jae Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/384,700

(22) Filed: Dec. 20, 2016

(65) Prior Publication Data
US 2017/0199619 A1     Jul. 13, 2017

(30) Foreign Application Priority Data
Jan. 8, 2016   (KR) .......................... 10-2016-0002530

(51) Int. Cl.
*G06F 3/041*     (2006.01)
*G06F 3/044*     (2006.01)

(52) U.S. Cl.
CPC ............ *G06F 3/044* (2013.01); *G06F 3/0412* (2013.01); *G06F 2203/04102* (2013.01); *G06F 2203/04111* (2013.01)

(58) Field of Classification Search
CPC ........ G06F 3/041; G06F 3/0416; G06F 3/044; G06F 2203/04111; G06F 2203/04102; G06F 3/04102
See application file for complete search history.

(56) References Cited

U.S. PATENT DOCUMENTS

| 2006/0148128 A1* | 7/2006 | Son .................... G02F 1/13452 |
| | | 438/106 |
| 2014/0139758 A1* | 5/2014 | Jian ....................... G06F 3/0412 |
| | | 349/12 |
| 2014/0232956 A1* | 8/2014 | Kwon ............... G02F 1/133305 |
| | | 349/12 |

(Continued)

FOREIGN PATENT DOCUMENTS

KR     10-2016-0063485     6/2016

*Primary Examiner* — Md Saiful A Siddiqui
(74) *Attorney, Agent, or Firm* — H.C. Park & Associates, PLC (57) ABSTRACT

A flexible touch sensing unit includes a substrate including a plane region and a bending region, a plurality of sensing electrodes disposed on the substrate, a plurality of sensing lines surrounding the plurality of sensing electrodes and electrically connected to the plurality of sensing electrodes, and a damage prevention layer disposed in the bending region. Cracks on the sensing electrodes and the sensing lines which are disposed in the bending region may be prevented by the damage prevention layer in the bending region. A resulting flexible display device using the flexible touch sensing unit may be thinner by omission of a flexibility enhancing layer.

19 Claims, 8 Drawing Sheets

(56) References Cited

U.S. PATENT DOCUMENTS

2016/0179229 A1* 6/2016 Ahn ............... G06F 3/041
                                                    345/173
2017/0090661 A1* 3/2017 Kim ............... G06F 3/0412

* cited by examiner

FLEXIBLE TOUCH SENSING UNIT AND FLEXIBLE DISPLAY DEVICE INCLUDING FLEXIBLE TOUCH SENSING UNIT

CROSS-REFERENCE TO RELATED APPLICATION

This application claims priority from and the benefit of Korean Patent Application No. 10-2016-0002530, filed on Jan. 8, 2016, which is hereby incorporated by reference for all purposes as if fully set forth herein.

BACKGROUND

Field

Exemplary embodiments relate to touch sensing units. More particularly, exemplary embodiments relate to flexible touch sensing units and flexible display devices including the flexible touch sensing units.

Discussion of the Background

A touch sensing unit (e.g., a touch screen panel) is an input device that allows a user's instruction to be input by selecting an instruction link displayed on the screen of a display device or the like with a user's hand or an object. The touch sensing unit may be formed on a front surface of the display device and may convert the contact location into an electrical signal. Specifically, the user's hand or the object may directly contact the touch sensing unit at the contact location. Since such a touch sensing unit may replace separate input devices (such as a keyboard or mouse) connected to the display device, use of touch sensing units has been growing.

Touch sensing units may be divided into various types, including but not limited to a resistive overlay type, a photosensitive type, and a capacitive type. Among those touch sensing units, the capacitive touch sensing unit may convert a contact location into an electrical signal by sensing a change in capacitance between a conductive sensing pattern and an adjacent sensing pattern or a ground electrode when a user's hand or an object comes in contact with the touch sensing unit.

Recently, a flexible display device has been developed, so a touch sensing unit attached on the flexible display device must also be flexible.

A conventional flexible sensing unit may generally include sensing electrodes. However, damage such a crack may occur on the sensing electrodes when the flexible touch sensing unit is bent. In other words, when a conventional flexible display device is bent, the sensing electrodes of the flexible sensing unit, which have relatively low flexibility, may not endure the stress caused by the deformation of the sensing electrodes. Thus, a crack may occur on the sensing electrodes. A flexibility enhancing layer may be disposed on the flexible touch sensing unit to prevent cracking on the sensing electrodes, however, a thickness of the flexible display device may increase due to the addition of the flexibility enhancing layer.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide flexible touch sensing units that prevent a damage such as a crack on a bending region.

Exemplary embodiments also provide flexible display devices including flexible touch sensing units that prevent a damage such as a crack on a bending region.

Additional aspects will be set forth in the detailed description which follows, and, in part, will be apparent from the disclosure, or may be learned by practice of the inventive concept.

An exemplary embodiment discloses a flexible touch sensing unit that includes a substrate having a plane region and a bending region, a plurality of sensing electrodes disposed on the substrate, a plurality of sensing lines surrounding the plurality of sensing electrodes, the plurality of sensing lines electrically connected to the plurality of sensing electrodes, and a damage prevention layer disposed in the bending region.

Another exemplary embodiment discloses a flexible display device that includes a display panel, a flexible touch sensing unit disposed on the display panel, and a window disposed on the flexible touch sensing unit. The flexible touch sensing unit may include a substrate including a plane region and a bending region, a plurality of sensing electrodes disposed on the substrate, a plurality of sensing lines electrically connected to the plurality of sensing electrodes, and a damage prevention layer disposed in the bending region.

According to an exemplary embodiment, the flexible touch sensing unit may include the damage prevention layer in the bending region, so that a crack on the sensing electrodes and the sensing lines which are disposed in the bending region may be prevented. The flexible display device may have a relatively thin thickness since the flexible display device may not require a flexibility enhancing layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
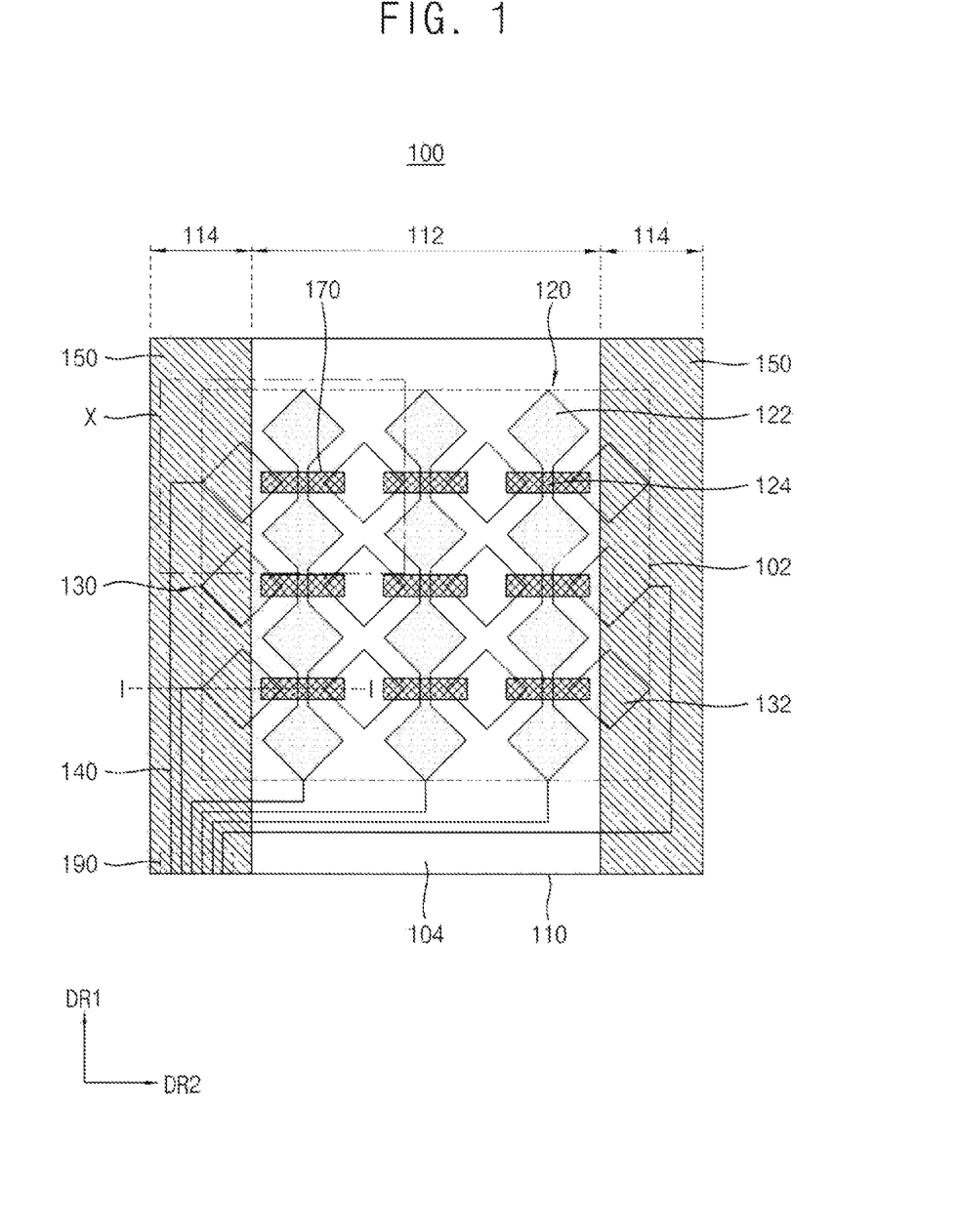
FIG. 1 is a plan view illustrating a flexible touch sensing unit in accordance with an exemplary embodiment.
Figure 2:
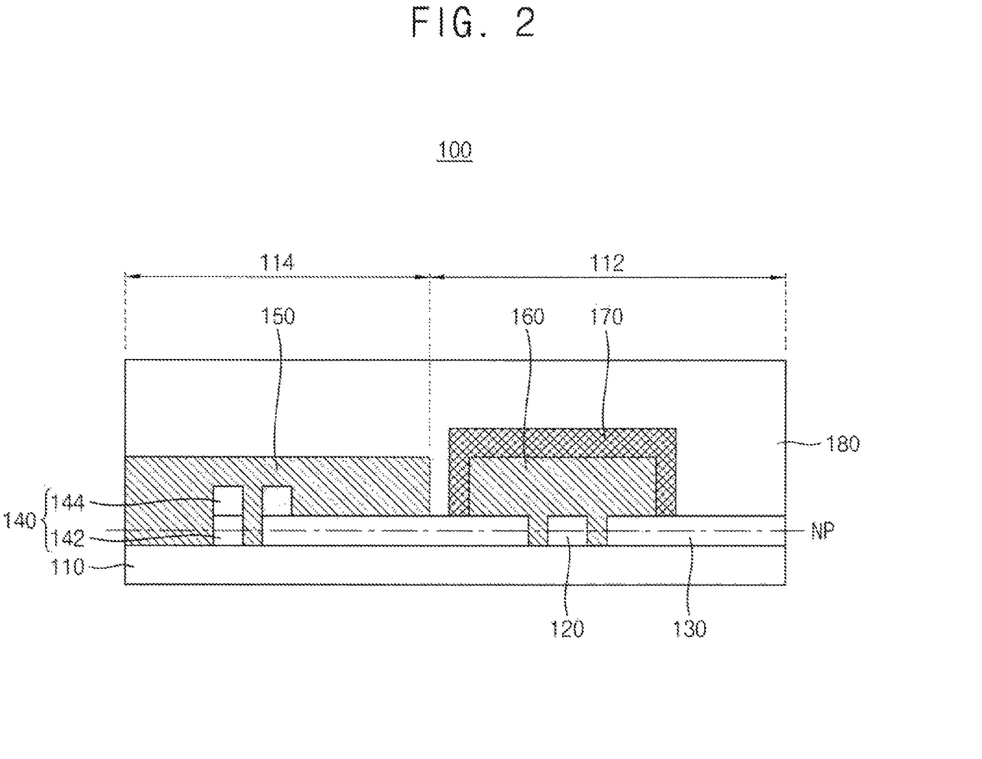
FIG. 2 is a cross-sectional view illustrating a flexible touch sensing unit in accordance with an exemplary embodiment.

FIG. 1 is a plan view illustrating a flexible touch sensing unit in accordance with an exemplary embodiment. FIG. 2 is a cross-sectional view illustrating a flexible touch sensing unit in accordance with an exemplary embodiment. For example, FIG. 2 may be a cross-sectional view cut along a line I-I' in FIG. 1.

Referring to FIG. 1, a flexible touch sensing unit 100 may include a substrate 110, a plurality of sensing electrodes, a plurality of sensing lines 140, a damage prevention layer 150, a pad portion 190, etc. Here, the plurality of sensing electrodes may include a plurality of first sensing electrodes 120 and a plurality of second sensing electrodes 130. In an exemplary embodiment, the flexible touch sensing unit 100 may further include an insulation layer 160, a bridge 170, and an oxidation prevention layer 180, as illustrated in FIG. 2.

The substrate 110 may include an active touch region 102 and an inactive region 104 surrounding the active touch region 102. The first and second sensing electrodes 120 and 130 may be disposed in the active touch region 102, and may sense touch inputs. The sensing lines 140 may be disposed in the inactive region 104, and may be electrically connected to the first and second sensing electrodes 120 and 130.

In an exemplary embodiment, the substrate 110 may include a plane region 112 and a bending region 114. When manufacturing or using the flexible touch sensing unit 100, the plane region 112 may maintain a substantially flat state and may be not bent. When manufacturing or using the flexible touch sensing unit 100, the bending region 114 may be bent or folded. The plane region 112 and the bending region 114 will be described in detail with reference to FIG. 3 and FIG. 4.

The substrate 110 may include flexible, transparent, and thermostable material. For example, the substrate 110 may include polyethylene terephthalate (PET) film having a phase difference function. Alternatively, the substrate 110 may include a low retardation film such as cyclic-olefin polymer (COP) film.

The first and second sensing electrodes 120 and 130 may be located in the active touch region 102. The flexible touch sensing unit 100 may sense the touch inputs from a user through the first and second sensing electrodes 120 and 130. When a hand of the user or an object touches the active touch region 102, capacitance between the first and second sensing electrodes 120 and 130 may be changed, and a sensing signal applied through the sensing lines 140 and the pad portion 190 may be delayed according to the change of the capacitance. The flexible touch sensing unit 100 may sense a touch location by the user according to the delayed sensing signal.

The first sensing electrodes 120 may extend along a first direction DR1, and adjacent first sensing electrodes 120 may be spaced apart from each other in a second direction DR2 substantially perpendicular to the first direction DR1. Each of the first sensing electrodes 120 may include first sensing patterns 122 and connecting patterns 124. For example, the first sensing patterns 122 may be substantially regularly arranged along the first direction DR1 and the second direction DR2. Adjacent first sensing patterns 122 may be electrically connected by the connecting patterns 124.

The second sensing electrodes 130 may extend along the second direction DR2, and adjacent second sensing electrodes 130 may be spaced apart from each other in the first direction DR1. Each of the second sensing electrodes 130 may include second sensing patterns 132 and the bridges 170. For example, the second sensing patterns 132 may be substantially regularly arranged along the first direction DR1 and the second direction DR2. Adjacent second sensing patterns 132 may be electrically connected by the bridges 170.

The inactive region 104 may correspond to a dead space adjacent to the active touch region 102. The sensing lines 140 and the pad portion 190 may be located in the inactive region 104. The sensing lines 140 may be electrically connected to the first sensing electrodes 120 and the second sensing electrodes 130, respectively. The pad portion 190 may include a touch processor (not illustrated) electrically connected to the first sensing electrodes 120 and the second sensing electrodes 130, respectively, through the sensing lines 140. The touch processor may include a signal provider and a signal processor. The signal provider may sequentially provide the sensing signals to the first and second sensing electrodes 120 and 130. The signal processor may sense a delayed value of the sensing signal to sense the touch location.

Referring to FIG. 2, the first sensing electrodes 120, the second sensing electrodes 130, and the sensing lines 140 may be disposed on the substrate 110. For example, the first and second sensing electrodes 120 and 130 may include indium tin oxide (ITO), indium zinc oxide (IZO), indium gallium zinc oxide (IGZO), and/or zinc aluminum oxide (ZAO).

The sensing line 140 may include a sensing conductive layer 142 and a sensing metal layer 144 disposed on the sensing conductive layer 142. The sensing conductive layer 142 may include substantially the same material as that of the first and second sensing electrodes 120 and 130. For example, the sensing metal layer 144 may include copper (Cu), silver (Ag), gold (Au), platinum (Pt), and/or aluminum (Al).

In an exemplary embodiment, after forming a conductive layer on the substrate 110, the conductive layer may be patterned by a photolithography process, or another suitable process, to form the first sensing electrodes 120, the second sensing electrodes 130, and the sensing conductive layer 142. Then, after forming a first metal layer to cover the first sensing electrodes 120, the second sensing electrodes 130, and the sensing conductive layer 142, the first metal layer may be patterned to form the sensing metal layer 144.

The insulation layer 160 may be disposed on the substrate 110 to cover the connecting pattern 124 of the first sensing electrode 120. The insulation layer 160 may be disposed on portions of the second sensing electrodes 130 which are adjacent to the connecting pattern 124. The insulation layer 160 may electrically insulate the bridge 170 from the first sensing electrodes 120. For example, the insulation layer 160 may include acrylate or epoxy based organic insulation material.

At least a portion of the sensing electrodes including the first and second sensing electrodes 120 and 130, and the sensing lines 140 may be disposed in the bending region 114 of the flexible touch sensing unit 100. When the bending region 114 is bent or folded, stress may be applied to the first sensing electrodes 120, the second sensing electrodes 130, and the sensing lines 140 which are located in the bending region 114. Thus, damage such as a crack may occur on the first sensing electrodes 120, the second sensing electrodes 130, and the sensing lines 140.

In an exemplary embodiment, the damage prevention layer 150 may be disposed in the bending region 114 of the flexible touch sensing unit 100. The damage prevention layer 150 may substantially cover and protect the first sensing electrodes 120, the second sensing electrodes 130, and the sensing lines 140 which are located in the bending region 114. Specifically, the damage prevention layer 150 may substantially reduce the stress that would be applied to the first sensing electrodes 120, the second sensing electrodes 130, and the sensing lines 140 which are located in the bending region 114, thereby preventing the damage on the first sensing electrodes 120, the second sensing electrodes 130, and the sensing lines 140.

As illustrated in FIG. 2, the first sensing electrodes 120, the second sensing electrodes 130, and the sensing lines 140, may be substantially positioned at a neutral plane NP since the damage prevention layer 150 is disposed on the first sensing electrodes 120, the second sensing electrodes 130, and the sensing lines 140. The neutral plane NP is a point, a line, or a plane at which a compressive stress and a tensile stress may not be applied when the flexible touch sensing unit 100 is bent. For example, when the flexible touch sensing unit 100 is bent down, the compressive stress may be applied to a lower portion of the bending region 114, and the tensile stress may be applied to an upper portion of the bending region 114. Hence, the stress may gradually move from the compressive stress to the tensile stress when moving from the lower portion of the bending region 114 to the upper portion of the bending region 114, and there is a threshold where both of the compressive stress and the tensile stress are not applied, which is the neutral plane NP. As described above, when the damage prevention layer 150 is formed to position the first sensing electrodes 120, the second sensing electrodes 130, and the sensing lines 140 at the neutral plane NP, damage, such as a crack caused by the compressive stress and/or the tensile stress, on the first sensing electrodes 120, the second sensing electrodes 130, and the sensing lines 140, may be prevented.

In an exemplary embodiment, the damage prevention layer 150 may include an acrylate or epoxy based organic insulation material. For example, the damage prevention layer 150 may include substantially the same material as that of the insulation layer 160. In an exemplary embodiment, after forming a preliminary insulation layer on the substrate 110 to substantially cover the first sensing electrodes 120, the second sensing electrodes 130, and the sensing lines 140, the preliminary insulation layer may be patterned to simultaneously form the damage prevention layer 150 and the insulation layer 160.

The bridge 170 electrically connecting the adjacent second sensing patterns 132 of the second sensing electrode 130 may be disposed on the insulation layer 160. In an exemplary embodiment, the bridge 170 may cover a side wall and a top surface of the insulation layer 160, and may electrically connect the adjacent second sensing patterns 132 that are spaced apart from each other with respect to the first sensing electrode 120. For example, the bridge 170 may include at least one of indium tin oxide (ITO) and titanium (Ti). In an exemplary embodiment, after forming a second metal layer on the second sensing electrodes 130 and the insulation layer 160, the second metal layer may be patterned to form the bridge 170.

In some exemplary embodiments, the flexible touch sensing unit 100 may further include an oxidation prevention layer 180 covering the first sensing electrodes 120, the second sensing electrodes 130, the damage prevention layer 150, and the bridge 170.

Figure 3:
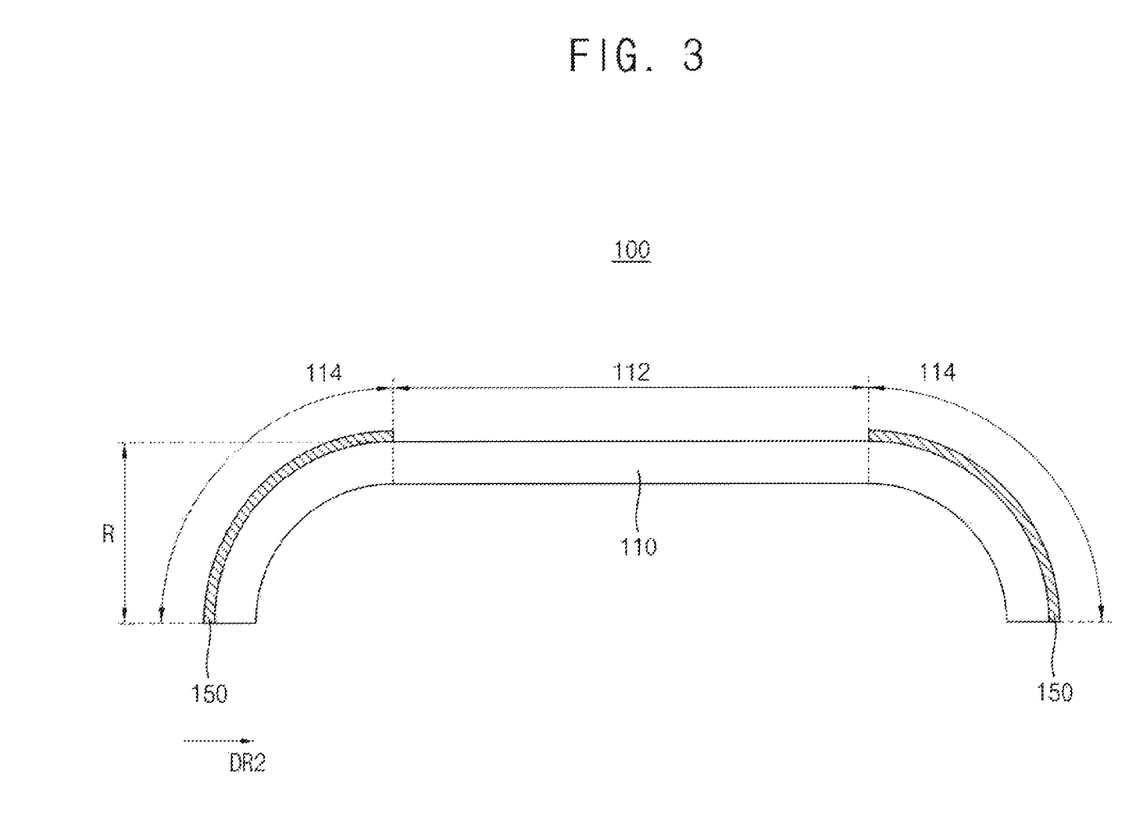
FIG. 3 and FIG. 4 are side views illustrating a flexible touch sensing unit in accordance with an exemplary embodiment.
Figure 4:
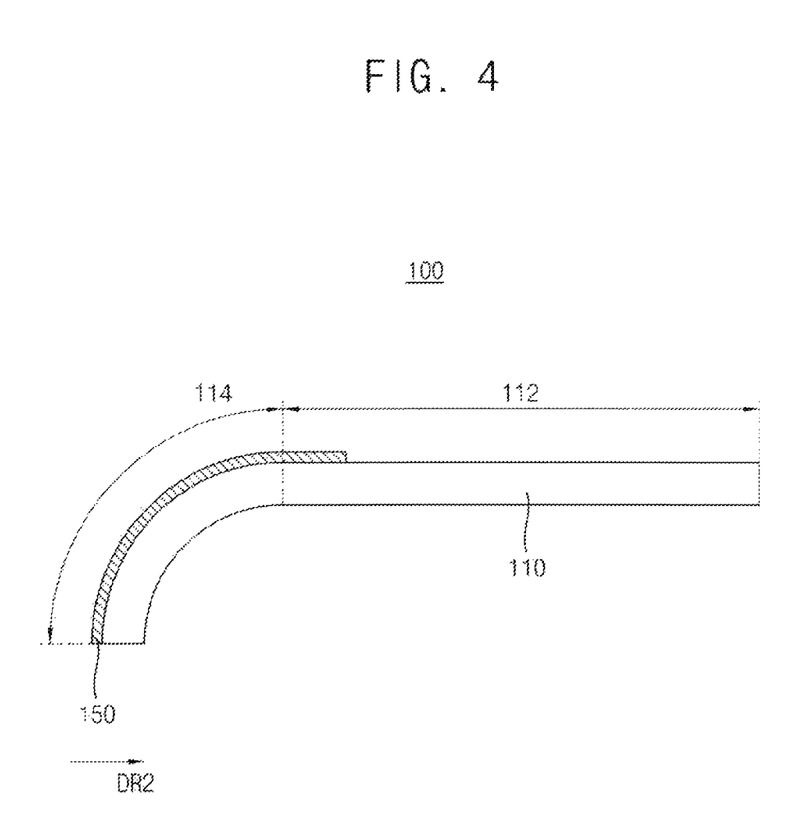

FIG. 3 and FIG. 4 are side views illustrating a flexible touch sensing unit in accordance with an exemplary embodiment.

Referring to FIG. 3, the substrate 110 may include the plane region 112 and the bending region 114. Here, portions of the bending region 114 may be located at opposing sides of the plane region 112. For example, the bending region 114 may be located adjacent to the plane region 112 in the second direction DR2 and a direction opposite to the second direction DR2. FIG. 3 illustrates that the portions of the bending region 114 located at opposing sides of the plane region 112 are symmetrically disposed, however the present invention is not limited thereto. Widths and/or curvatures of the both portions of the bending region 114 may be changed depending on the size or the structure of the flexible touch sensing unit 100.

The damage prevention layer 150 may be disposed on the bending region 114 adjacent to the plane region 112. In an exemplary embodiment, as illustrated in FIG. 3, a width of the damage prevention layer 150 may be substantially the same as that of the bending region 114. Accordingly, the occurrence of damage, such as a crack on the sensing electrodes and the sensing lines which are located in the bending region 114, may be prevented.

In an exemplary embodiment, the bending region 114 may have a radius of curvature R in a range between about 3 mm and about 3.7 mm. The width of the damage prevention layer 150 may be changed according to the radius of curvature R of the bending region 114. For example, when the radius of curvature R of the bending region 114 is about 3 mm, the width of the damage prevention layer 150 may be about 3.335 mm. Alternatively, when the radius of curvature R of the bending region 114 is about 3.7 mm, the width of the damage prevention layer 150 may be about 4.272 mm.

Referring to FIG. 4, the bending region 114 may be located at one side of the plane region 112. For example, the bending region 114 may be located adjacent to the plane region 112 in the second direction DR2 or the direction opposite thereto.

The damage prevention layer 150 may be disposed on the bending region 114. In an exemplary embodiment, as illustrated in FIG. 4, a width of the damage prevention layer 150 may be substantially greater than that of the bending region 114, so that the damage prevention layer 150 may cover a portion of the plane region 112 as well as an entirety of the bending region 114. Accordingly, the occurrence of damage, such as a crack on the sensing electrodes and the sensing lines which are located in the bending region 114, may be prevented.

Figure 5:
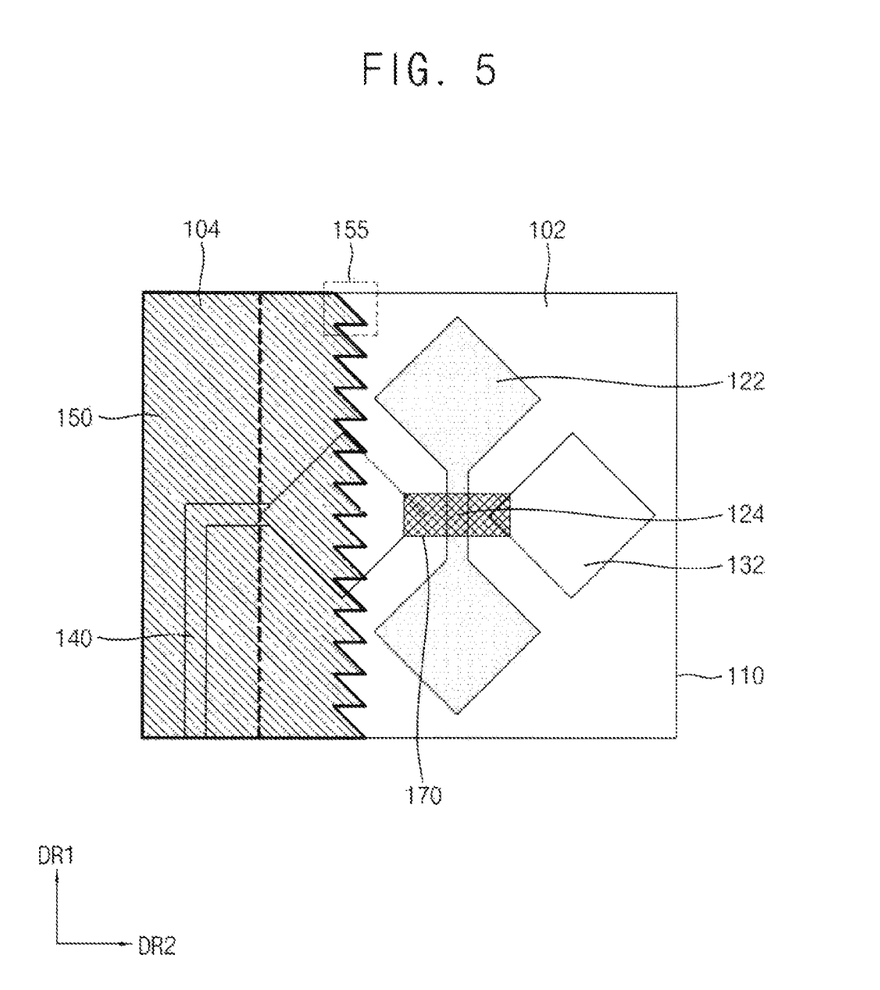
FIG. 5, FIG. 6, and FIG. 7 are plan views illustrating an enlarged portion of the flexible touch sensing unit in FIG. 1.
Figure 6:
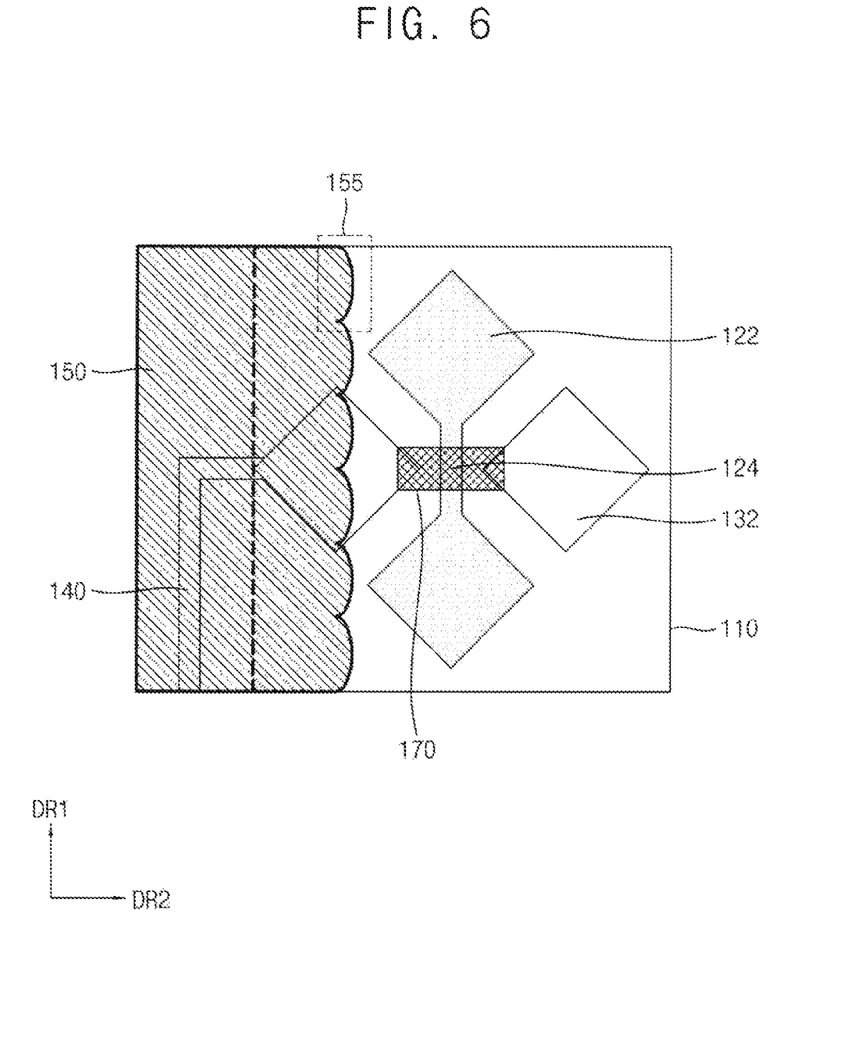
Figure 7:
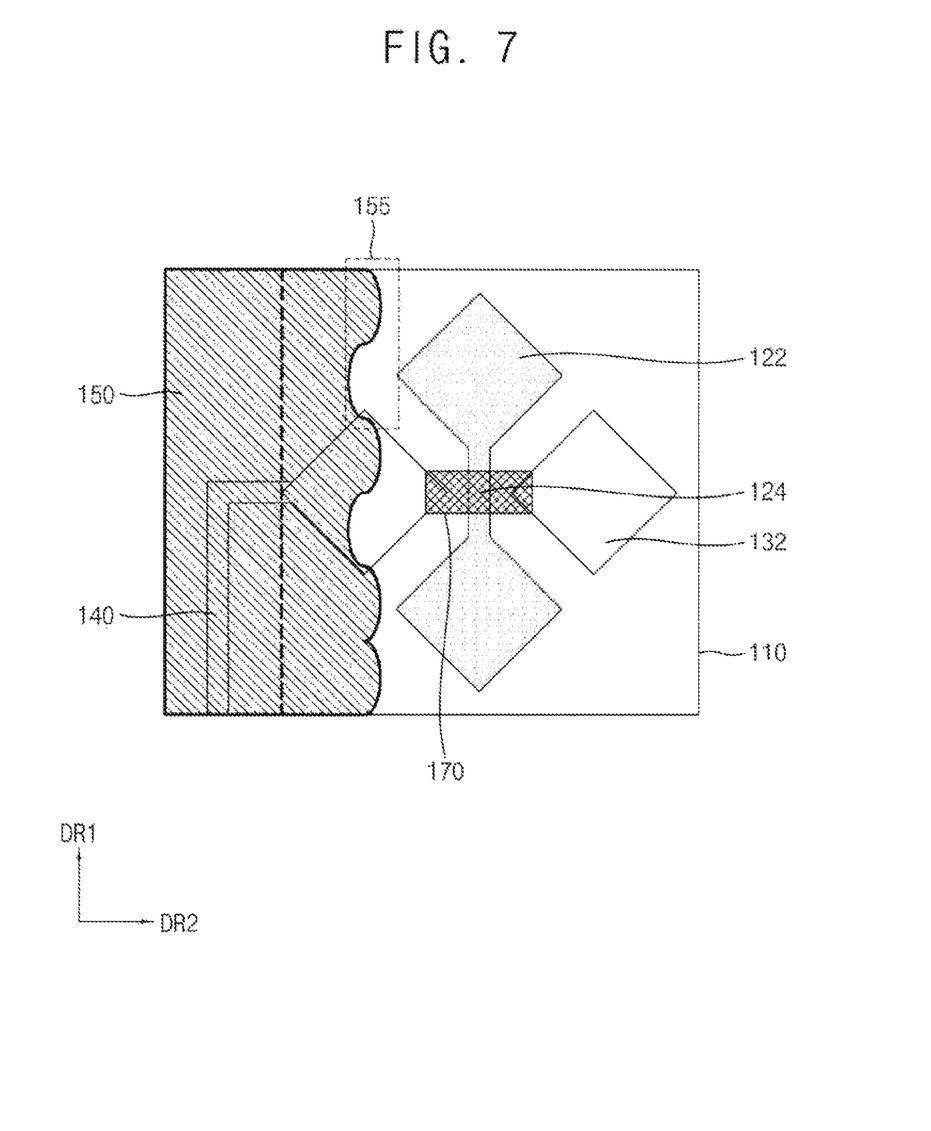

FIG. 5, FIG. 6, and FIG. 7 are plan views illustrating an enlarged portion of the flexible touch sensing unit in FIG. 1. For example, FIGS. 5 to 7 are plan views illustrating a portion 'X' in FIG. 1.

Referring to FIG. 5, the first sensing patterns 122, the second sensing patterns 132, and the sensing line 140, may be disposed on the substrate 110. Additionally, the damage prevention layer 150 covering at least a portion of the first and second sensing patterns 122 and 132, and the sensing line 140, may be disposed on the substrate 110. Therefore, the damage prevention layer 150 may be disposed on at least a portion of the active touch region 102 where the first and second sensing patterns 122 and 132 are located as well as the inactive region 104 where the sensing line 140 is located.

In an exemplary embodiment, a display device including the flexible touch sensing unit 100 may include a display region where a plurality of pixels for displaying images are disposed, and a non-display region where driving circuits for providing signals to the pixels are disposed. Here, the active touch region 102 may correspond to the display region of the display device, and the inactive region 104 may correspond to the non-display region of the display device. For example, the damage prevention layer 150 may include colored organic insulation material. Accordingly, when the damage prevention layer 150 is disposed in at least a portion of the active touch layer 102 corresponding to the display region, the user may recognize a boundary between a region where the damage prevention layer 150 is disposed and a region where the damage prevention layer 150 is not disposed. To prevent the recognition of the boundary, an edge portion of the damage prevention layer 150 may have a concavo-convex pattern 155. For example, a plurality of concavo-convex patterns 155 may be disposed at the edge portion of the damage prevention layer 150 which is formed on the boundary between the region where the damage prevention layer 150 is disposed and the region where the damage prevention layer 150 is not disposed. For example, the concavo-convex pattern 155 of the damage prevention layer 150 may have a sawtooth shape.

In some an exemplary embodiment, as illustrated in FIG. 6, the concavo-convex pattern 155 of the damage prevention layer 150 may have an embossing shape. In some exemplary embodiments, as illustrated in FIG. 7, the concavo-convex pattern 155 of the damage prevention layer 150 may have a wave-like shape. Here, the wave-like shape may correspond to a sine curve shape. The concavo-convex pattern 155 may have the sawtooth shape, the embossing shape, or the wave-like shape, as illustrated in FIGS. 5 to 7. However, the shape of the concavo-convex pattern 155 is not limited thereto. The concavo-convex pattern 155 of the damage prevention layer 150 may have various shapes for reducing the recognition of the boundary between the region where the damage prevention layer 150 is disposed and the region where the damage prevention layer 150 is not disposed.

Figure 8:
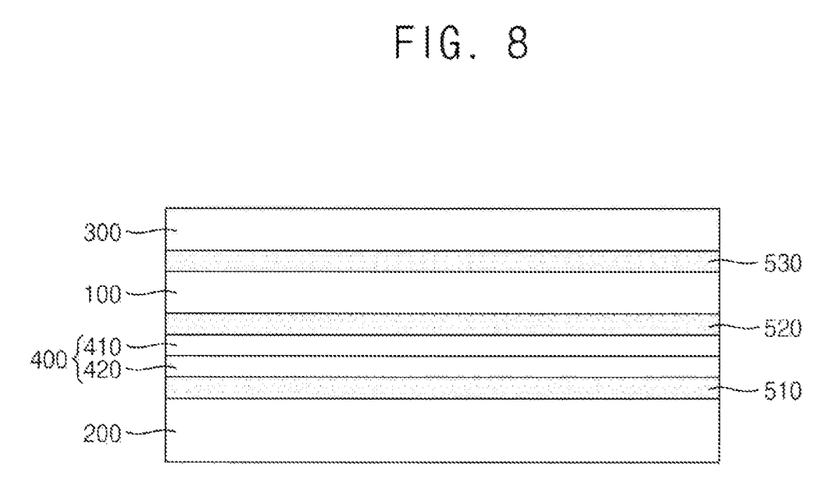
FIG. 8 and FIG. 9 are cross-sectional views illustrating a flexible display device in accordance with an exemplary embodiment.
Figure 9:
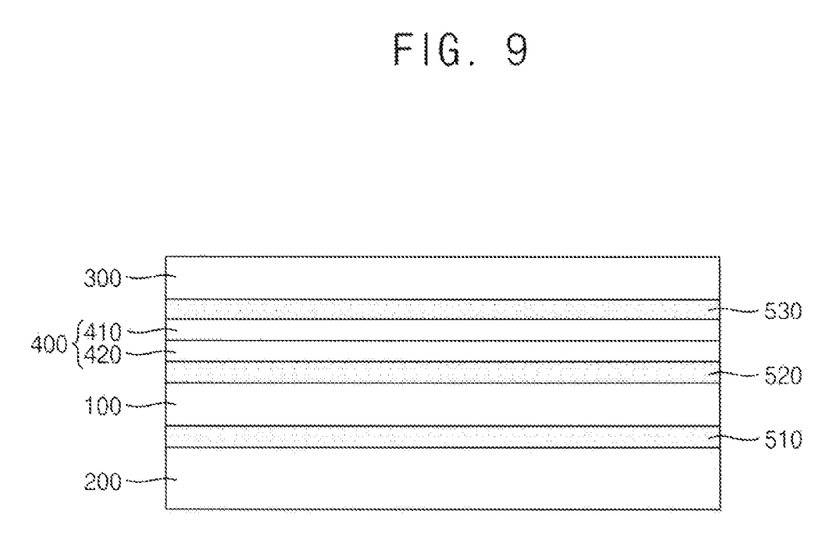

FIG. 8 and FIG. 9 are cross-sectional views illustrating a flexible display device in accordance with exemplary embodiments.

Referring to FIGS. 8 and 9, a flexible display device may include a flexible touch sensing unit 100, a display panel 200, a window 300, a polarizer 400, etc. The flexible touch sensing unit 100, the display panel 200, the window 300, and the polarizer 400 may be attached by transparent adhesive members 510, 520, and 530 to form the stack-up structure. The display panel 200, the window 300, and the polarizer 400, may be flexible.

The display panel 200 may be a flexible organic light emitting display (OLED) panel. The OLED panel may not require a backlight unit distinct from a liquid crystal display (LCD) panel, and a substrate of the OLED panel may be formed by using polymethyl methacrylate (PMMA), acryl, polyester, etc.

The window 300 may be disposed on the display panel 200. The window 300 may not consist of hard material such as glass, and may include flexible and transparent material such as polymethyl methacrylate (PMMA), acryl, polyester, polyimide (PI), etc. The window 300 may serve as a transparent substrate located at a topmost layer of the flexible display device, and may support and protect elements thereunder.

The flexible touch sensing unit 100 and the polarizer 400 may be disposed between the display panel 200 and the window 300. The flexible touch sensing unit 100 in FIGS. 8 and 9 may be substantially the same as the flexible touch sensing unit 100 described with reference to FIGS. 1 to 7. Therefore, repeated descriptions of the flexible touch sensing unit 100 in FIGS. 8 and 9 may be omitted.

The polarizer 400 may include a linear polarizing layer 410 and a phase retardation layer 420, and the linear polarizing layer 410 may be disposed on the phase retardation layer 420.

The linear polarizing layer 410 may selectively allow the transmission of light. The linear polarizing layer 410 may allow transmission of light having an amplitude in a single plane. For example, when the pattern of the linear polarizing layer 410 includes horizontal stripes, the linear polarizing layer 410 may block light having an amplitude in a vertical direction, and may transmit light having an amplitude in a horizontal direction. When the pattern of the linear polarizing layer 410 includes vertical stripes, the linear polarizing layer 410 may block light having an amplitude in the horizontal direction, and may transmit light having an amplitude in the vertical direction.

The phase retardation layer 420 may convert the phase of the transmitted light. The phase retardation layer 420 may convert vertically polarized light and horizontally polarized light into right-circularly polarized light and left-circularly polarized light, respectively. Additionally, the phase retardation layer 420 may convert the right-circularly polarized light and the left-circularly polarized light into vertically polarized light and horizontally polarized light, respectively. For example, when unpolarized light passes through the linear polarizing layer 410, the linear polarizing layer 410 including the horizontal stripes may convert the unpolarized light into horizontally polarized light. When the horizontally polarized light passes through the phase retardation layer 420, the horizontally polarized light may be converted to left-circularly polarized light. The left-circularly polarized light may be reflected by an electrode of the display panel 200 and be converted into right-circularly polarized light. When the right-circularly polarized light passes through the phase retardation layer 420 again, the right-circularly polarized light may be converted into vertically polarized light. The vertically polarized light may be blocked by the linear polarizing layer 410 including the horizontal stripes. Accordingly, the unpolarized light may be substantially eliminated by the polarizer 400.

Compared to a conventional polarizer, the polarizer 400 may not include a triacetyl cellulose (TAC) support layer. Therefore, a thickness of the polarizer 400 may decrease so that the flexibility of the polarizer 400 may improve, and a thickness of the flexible display device may decrease.

In an exemplary embodiment, as illustrated in FIG. 8, the polarizer 400 may be disposed on the display panel 200, and the flexible touch sensing unit 100 may be disposed on the polarizer 400. External light incident from the outside of the flexible display device immediately reaches the display panel 200 after passing through the polarizer 400. Thus, the external light can be eliminated by the polarizer 400 as described above. In this case, the substrate 110 of the flexible touch sensing unit 100 may include a polyethylene terephthalate (PET) film having a phase difference function or a cyclic-olefin polymer (COP) film having a low phase retardation value.

In some exemplary embodiments, as illustrated in FIG. 9, the flexible touch sensing unit 100 may be disposed on the display panel 200, and the polarizer 400 may be disposed on the flexible touch sensing unit 100. Since the external light incident from the outside of the flexible display device passes through the polarizer 400 and then passes through the flexible touch screen panel 100, the material suitable for implementing the substrate 110 of the flexible touch screen panel 100 may be limited. In this case, the substrate 110 of the flexible touch sensing unit 100 may include a cyclic-olefin polymer (COP) film or the like having a low phase retardation value. Therefore, the light transmitted through the polarizer 400 may be unaffected by the substrate 110 of the flexible touch sensing unit 100, and may be eliminated by the polarizer 400 after being reflected by the electrode of the display panel 200.

The transparent adhesive members 510, 520, and 530 may be interposed between the flexible touch sensing unit 100, the display panel 200, the window 300, and the polarizer 400. The transparent adhesive members 510, 520, and 530 may include transparent adhesive such as optical cleared adhesive (OCA), super view resin (SVR), etc.

In a flexible display device including a conventional touch sensing unit, a flexibility enhancing layer may be disposed on the touch sensing unit to prevent damage, such as a crack, on the bending region. However, a thickness of the flexible display device may increase according to the addition of the flexibility enhancing layer. In the flexible display device in accordance with an exemplary embodiment of the present invention, the flexible touch sensing unit 100 may include the damage prevention layer 150 in the bending region 114 so that the conventional flexibility enhancing layer may be not required, and the flexible display device may have a relatively thin thickness.

Although flexible touch sensing units and flexible display devices including the flexible touch sensing units in accordance with exemplary embodiments have been described with reference to the accompanying drawings, the present invention is not limited thereto. Those skilled in the art will readily appreciate that many modifications are possible in the exemplary embodiments without materially departing from the novel teachings and advantages of the present inventive concept.

The flexible touch sensing units according to an exemplary embodiment may be applied to various electronic devices. For example, the flexible touch sensing units may be applied to computers, notebooks, mobile phones, smart phones, smart pads, personal media players (PMP), personal digital assistance (PDA), MP3 players, digital cameras, video camcorders, etc.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A flexible touch sensing unit, comprising:
a substrate comprising a plane region and a bending region;

sensing electrodes disposed on the substrate wherein a first plurality of the sensing electrodes is disposed in the plane region and a second plurality of the sensing electrodes is disposed in the bending region;
a plurality of sensing lines surrounding the sensing electrodes wherein the plurality of sensing lines are electrically connected to the sensing electrodes and disposed in the bending region; and
a damage prevention layer disposed in the bending region and extending to cover a portion of the plane region, wherein:
the damage prevention layer overlaps the plurality of sensing lines in the bending region, the second plurality of sensing electrodes in the bending region, and at least some of the first plurality of sensing electrodes in the plane region in plan view, and
an edge of the damage prevention layer covering some of the first plurality of sensing electrodes in the plane region comprises a concavo-convex pattern in plan view.

2. The flexible touch sensing unit of claim 1, wherein the damage prevention layer is disposed in the bending region and at least a portion of the plane region.

3. The flexible touch sensing unit of claim 1, wherein the bending region is adjacent to opposing sides of the plane region.

4. The flexible touch sensing unit of claim 1, wherein the bending region is adjacent to one side of the plane region.

5. The flexible touch sensing unit of claim 1, wherein the bending region has a radius of curvature in a range between 3 mm and 3.7 mm.

6. The flexible touch sensing unit of claim 1, wherein the substrate comprises at least one of polyethylene terephthalate (PET) and cyclic-olefin polymer (COP).

7. The flexible touch sensing unit of claim 1, wherein the plurality of sensing electrodes comprise at least one of indium tin oxide (ITO), indium zinc oxide (IZO), indium gallium zinc oxide (IGO), and zinc aluminum oxide (ZAO).

8. The flexible touch sensing unit of claim 1, wherein the damage prevention layer comprises an organic insulation material.

9. The flexible touch sensing unit of claim 1, wherein the plurality of sensing electrodes comprise:
a plurality of first sensing electrodes extending along a first direction, each comprising first sensing patterns spaced apart from each other and a connecting pattern electrically connecting adjacent first sensing patterns; and
a plurality of second sensing electrodes extending along a second direction perpendicular to the first direction, each comprising second sensing patterns spaced apart from each other.

10. The flexible touch sensing unit of claim 9, further comprising an insulation layer covering the connecting pattern.

11. The flexible touch sensing unit of claim 10, wherein the damage prevention layer comprises a same material as that of the insulation layer.

12. The flexible touch sensing unit of claim 10, further comprising a bridge disposed on the insulation layer, the bridge electrically connecting adjacent second sensing patterns.

13. The flexible touch sensing unit of claim 1, wherein the concavo-convex pattern has at least one of a sawtooth shape, an embossing shape, and a wave-like shape.

14. A flexible display device, comprising:
a display panel;
a flexible touch sensing unit disposed on the display panel; and
a window disposed on the flexible touch sensing unit,
wherein the flexible touch sensing unit comprises a substrate comprising a plane region and a bending region; a plurality of sensing electrodes disposed on the substrate; a plurality of sensing lines electrically connected to the plurality of sensing electrodes; and a damage prevention layer disposed in the bending region,
wherein a first portion of the plurality of sensing electrodes is disposed in the plane region,
wherein the plurality of sensing lines and a second portion of the plurality of sensing electrodes are disposed in the bending region,
wherein the damage prevention layer overlaps the plurality of sensing lines in the bending region, the second plurality of sensing electrodes in the bending region, and at least some of the first plurality of sensing electrodes in the plane region in plan view, and
wherein an edge of the damage prevention layer covering some of the first plurality of sensing electrodes in the plane region comprises a concavo-convex pattern in plan view.

15. The flexible display device of claim 14, further comprising a polarizer disposed between the window and the display panel.

16. The flexible display device of claim 15, wherein the flexible touch sensing unit is disposed on the polarizer.

17. The flexible display device of claim 15, wherein the flexible touch sensing unit is disposed under the polarizer.

18. The flexible display device of claim 17, wherein the substrate of the flexible touch sensing unit comprises cyclic-olefin polymer (COP).

19. The flexible display device of claim 14, wherein the concavo-convex pattern has at least one of a sawtooth shape, an embossing shape, and a wave-like shape.

* * * * *